(12) United States Patent
Ng et al.

(10) Patent No.: US 11,191,373 B2
(45) Date of Patent: Dec. 7, 2021

(54) MOUNTING DEVICE FOR WALL-MOUNTED ARTICLES

(71) Applicant: Nielsen & Bainbridge, LLC., Wilmington, DE (US)

(72) Inventors: Kimkie Ng, Hong Kong (HK); Patrick Pun, Tuen Mun (HK); Randall Ben Faltesek, Georgetown, TX (US); Jamey Yarnall, Leander, TX (US); John Fenno, Cleves, OH (US)

(73) Assignee: Nielsen & Bainbridge, LLC., Wilmington, DE (US)

( * ) Notice: Subject to any disclaimer, the term of this patent is extended or adjusted under 35 U.S.C. 154(b) by 0 days.

(21) Appl. No.: 16/691,792

(22) Filed: Nov. 22, 2019

(65) Prior Publication Data

US 2020/0085215 A1    Mar. 19, 2020

Related U.S. Application Data

(63) Continuation of application No. PCT/US2018/035699, filed on Jun. 1, 2018.
(Continued)

(51) Int. Cl.
*F16M 11/00*       (2006.01)
*A47G 1/16*        (2006.01)
(Continued)

(52) U.S. Cl.
CPC ........... *A47G 1/1606* (2013.01); *F16M 13/02* (2013.01); *A47B 97/001* (2013.01)

(58) Field of Classification Search
CPC ..... F16M 13/02; A47G 1/1606; A47G 1/1613
See application file for complete search history.

(56) References Cited

U.S. PATENT DOCUMENTS

| D29,072 S | 7/1898 | Dolby |
| D31,665 S | 10/1899 | McKay |

(Continued)

FOREIGN PATENT DOCUMENTS

WO    2011122952    10/2011

OTHER PUBLICATIONS

Search Report, PCT/US18/35699, dated Sep. 17, 2018, 2 pgs.
(Continued)

*Primary Examiner* — Amy J. Sterling
(74) *Attorney, Agent, or Firm* — Egan, Enders & Huston LLP.

(57) ABSTRACT

A mounting device is provided for hanging articles on a wall or other mounting surface. The disclosed mounting device includes a bracket having a raised center portion arranged between two side portions formed integral and contiguous with the raised center portion, and a fastener having a flattened head and a shaft extending therefrom. The raised center portion of the bracket includes a first pair of opposing sidewalls, and the flattened head of the fastener includes a second pair of opposing sidewalls. When the flattened head of the fastener is slidably engaged with the raised center portion of the bracket, each of the second pair of opposing sidewalls is arranged adjacent and parallel to a respective one of the first pair of opposing sidewalls. This prevents substantial rotational movement of the bracket around the fastener to ensure that the wall-mounted article remains at a desired location and orientation on the wall.

22 Claims, 12 Drawing Sheets

Related U.S. Application Data

(60) Provisional application No. 62/514,193, filed on Jun. 2, 2017.

(51) Int. Cl.
*F16M 13/02* (2006.01)
*A47B 97/00* (2006.01)

(56) References Cited

U.S. PATENT DOCUMENTS

| | | |
|---|---|---|
| 795,553 A | 7/1905 | Sherman |
| 895,846 A | 8/1908 | Diers |
| 1,338,154 A | 4/1920 | Pipkin |
| D139,216 S | 7/1944 | Spanholtz |
| 2,443,149 A * | 6/1948 | Rundell ............... A47G 1/1613 248/264 |
| 2,639,109 A * | 5/1953 | Hoag .................... A47G 1/162 248/497 |
| D197,188 S | 12/1963 | Anderson |
| 3,300,173 A | 1/1967 | Kennedy |
| 3,529,799 A * | 9/1970 | Schaefer ............. A47G 1/0655 248/496 |
| 3,878,589 A | 4/1975 | Schaefer |
| D235,308 S | 6/1975 | Clarke |
| 3,912,216 A | 10/1975 | Gano |
| D239,593 S | 4/1976 | Douma |
| D243,190 S | 1/1977 | Knutsson et al. |
| D244,508 S | 5/1977 | Neece |
| D246,346 S | 11/1977 | Strunk |
| 4,132,335 A | 1/1979 | Ingram |
| D252,851 S | 9/1979 | Church |
| 4,171,117 A * | 10/1979 | Prochaska ............ A47G 1/1613 248/495 |
| D262,688 S | 1/1982 | Nilsson |
| 4,419,794 A | 12/1983 | Horton et al. |
| D272,044 S | 1/1984 | Fesler |
| D272,211 S | 1/1984 | Rock et al. |
| 4,458,872 A | 7/1984 | Couch |
| D295,369 S | 4/1988 | Niwa |
| D298,604 S | 11/1988 | Newton |
| D303,716 S | 9/1989 | Waller |
| D310,479 S | 9/1990 | Speetzen |
| D313,740 S | 1/1991 | Witt |
| 5,014,892 A | 5/1991 | Copeland |
| 5,054,170 A | 10/1991 | Otrusina |
| D324,991 S | 3/1992 | Gary |
| D329,192 S | 9/1992 | Susac |
| 5,398,906 A * | 3/1995 | Aydelott ............... A47G 1/205 248/477 |
| 5,484,126 A | 1/1996 | Kitchin |
| 5,549,234 A | 8/1996 | Hong |
| 5,605,313 A | 2/1997 | Erickson et al. |
| 5,687,942 A | 11/1997 | Johnson |
| D5,850,954 | 12/1998 | Dong-Joo |
| D408,267 S | 4/1999 | Egigian et al. |
| D409,079 S | 5/1999 | Sobczynski |
| D409,663 S | 5/1999 | Wagner et al. |
| D410,032 S | 5/1999 | Wagner et al. |
| D414,207 S | 9/1999 | Wagner et al. |
| D428,058 S | 7/2000 | Wagner |
| 6,142,892 A | 11/2000 | Dennis |
| D438,536 S | 3/2001 | Willison et al. |
| D452,081 S | 12/2001 | Rowan |
| D454,591 S | 3/2002 | Vidmar et al. |
| D464,993 S | 10/2002 | Rosen |
| D465,147 S | 11/2002 | Chaky |
| D468,357 S | 1/2003 | Rosen |
| D492,187 S | 6/2004 | Mottini |
| 6,866,940 B1 | 3/2005 | Laughlin |
| D507,959 S | 8/2005 | Mottini |
| D511,088 S | 11/2005 | Chiu |
| D531,223 S | 10/2006 | Lynch |
| D547,637 S | 7/2007 | Blacker |
| D560,221 S | 1/2008 | Hoglan et al. |
| D567,740 S | 4/2008 | Smith |
| D572,117 S | 7/2008 | Daun et al. |
| D572,122 S | 7/2008 | Cave |
| 7,594,632 B2 | 9/2009 | Van Den Bossche et al. |
| D607,711 S | 1/2010 | Adams et al. |
| D623,046 S | 9/2010 | Murphy |
| D623,507 S | 9/2010 | Bowen |
| D629,293 S | 12/2010 | DuFour |
| 8,303,226 B1 | 11/2012 | Derrig et al. |
| D685,991 S | 7/2013 | Pearce |
| 8,544,805 B2 | 10/2013 | Virgin |
| D704,035 S | 5/2014 | Wills |
| D715,859 S | 10/2014 | Costas |
| D732,929 S | 6/2015 | Harrow |
| 9,138,082 B2 | 9/2015 | Crescenzo |
| D753,982 S | 4/2016 | Guirlinger |
| 9,683,696 B2 | 6/2017 | McCullough et al. |
| D817,152 S | 5/2018 | Ng et al. |
| D818,801 S | 5/2018 | Ng et al. |
| D819,428 S | 6/2018 | Ng et al. |
| D829,079 S | 9/2018 | Hailing |
| 2006/0186304 A1 | 8/2006 | McGee |
| 2007/0039907 A1 | 2/2007 | Zandt |
| 2007/0186384 A1* | 8/2007 | Broehl ................ A47G 1/1613 16/355 |
| 2008/0209698 A1 | 9/2008 | Colorado |
| 2008/0237282 A1 | 10/2008 | Sin |
| 2008/0272257 A1 | 11/2008 | Murphy |
| 2013/0168429 A1 | 7/2013 | Pearce |
| 2013/0232840 A1 | 9/2013 | Miller |
| 2015/0204366 A1 | 7/2015 | Cave |

OTHER PUBLICATIONS

Dovetailed Hanging Slots in the Art Boards Watercolor Art Panels, Printed from Internet Jan. 8, 2019, http://www.art-boards.com/cp-slotdiagam-watercc.html, 2 pgs.

China DLC Machinery Co., Barbed U Pin Making Machine for Cable Pin or Pipe Pin Making, 2011, 2 pgs.

HP Quick Release Kit, New Retail, EM870AA, 2011, 2 pgs.

No Stud? No Problem!: No Stud Drywall Picture Hanger, 2010, 1 pg.

Quick Release Grey Lcd Tv Vesa Wall Bracket, Ref. 11409115, 2015, 2 pgs.

Spring Lock, Spring Lock Security Picture Fixings, 2 pgs.

* cited by examiner

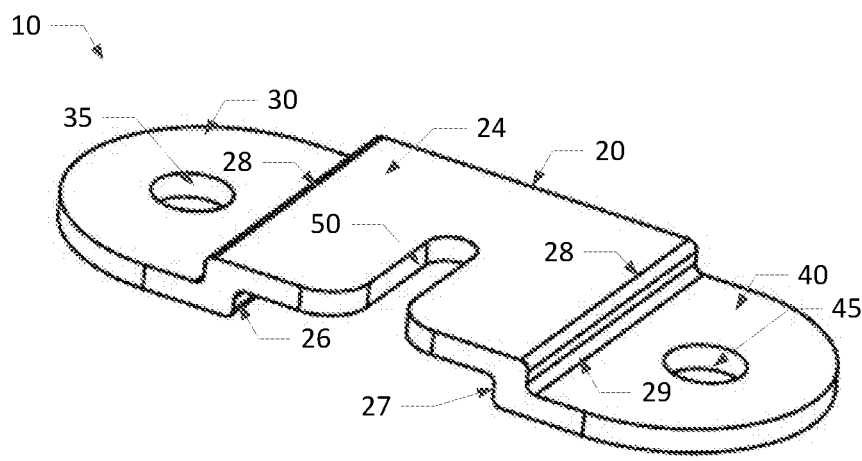
FIG. 1
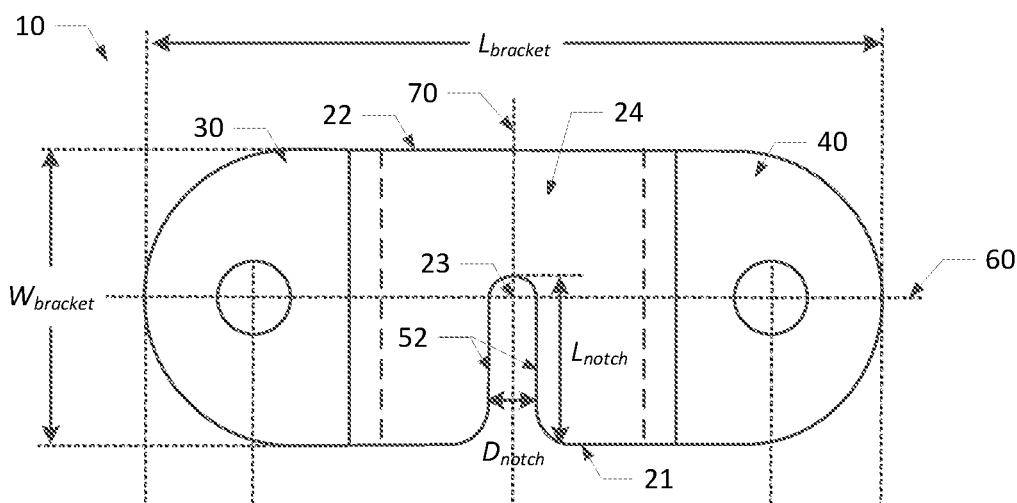
FIG. 2
FIG. 3
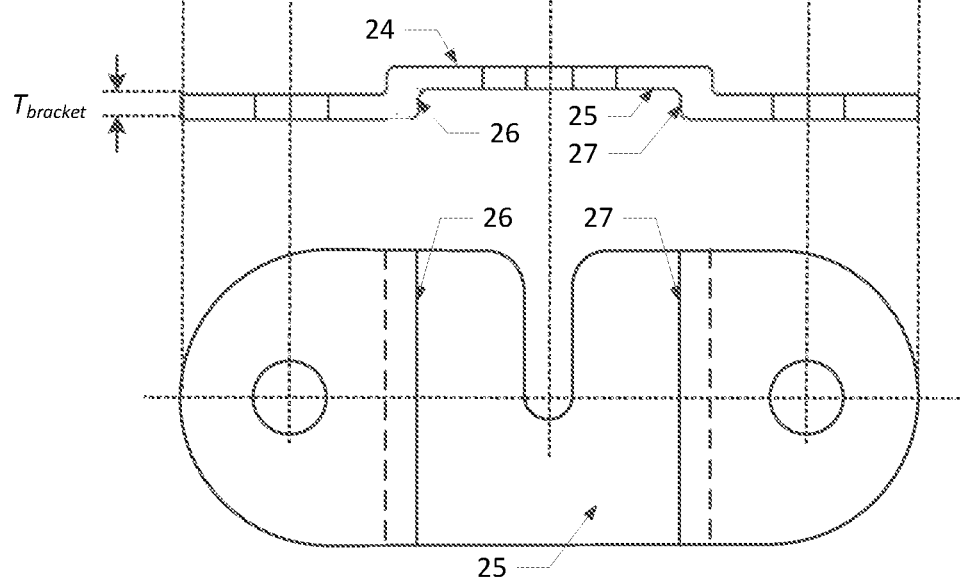
FIG. 4

MOUNTING DEVICE FOR WALL-MOUNTED ARTICLES

PRIORITY CLAIM

This application is a continuation of International Patent Application No. PCT/US2018/035699 filed Jun. 1, 2018, which designates the United States and claims priority to U.S. Provisional Patent Application No. 62/514,193, filed Jun. 2, 2017.

BACKGROUND

1. Field of the Disclosure

This disclosure relates to mounting devices for wall-mounted articles and, more particularly, to mounting devices that maintain wall-mounted articles in a desired location and orientation once hung.

2. Description of the Relevant Art

The following descriptions and examples are provided as background only and are intended to reveal information that is believed to be of possible relevance to the present invention. No admission is necessarily intended, or should be construed, that any of the following information constitutes prior art impacting the patentable character of the subjected matter claimed herein.

There are many different types of mounting devices available for mounting or hanging articles, such as frames, mirrors, art, bulletin boards, clocks and other wall-mounted articles, on a vertical surface, such as a wall. These include various forms of hooks, brackets, wires and bores, which are typically used in conjunction with traditional nails, screws, bolts, etc. Some wall-mounted articles are commercially available with mounting devices pre-installed onto the article. This may increase the packaging size of such articles, in some cases. When mounting devices are pre-installed onto an article, the consumer may be unable to choose an alternative orientation for hanging the article, and/or may be unable to use an alternative mounting device more suitable to his/her needs. Other commercially available wall-mounted articles are provided with a mounting device, which the consumer installs on the back of the article prior to hanging.

In either case (i.e., articles provided with pre-installed or separate mounting devices), the mounting devices provided with such articles typically use traditional fasteners, such as nails, screws, bolts etc., for attaching the articles to a wall. One problem with such mounting devices is that additional tools, such as a hammer, screw driver, etc., are often required to insert such fasteners into the wall. Once a fastener is inserted, it can be difficult to blindly align the mounting device onto the wall-mounted fastener. Another problem with such mounting devices is that they often fail to maintain the wall-mounted article at the desired orientation. For example, actions such as dusting, bumping into walls or slamming doors often disturb wall-mounted articles, causing them to be crooked or skewed from the desired orientation.

A need, therefore, exists for a mounting device for hanging wall-mounted articles that overcomes the disadvantages of commercially available devices.

SUMMARY

The present disclosure provides various embodiments of mounting devices, wall-mounted articles comprising such mounting devices and methods for hanging wall-mounted articles via such mounting devices. The following description of various embodiments of mounting devices, wall-mounted articles and methods represent example embodiments and is not to be construed in any way as limiting the subject matter of the appended claims.

According to one embodiment, a mounting device for hanging wall-mounted articles is provided herein with a specially configured bracket and fastener. In general, the bracket may be described as having a raised center portion arranged between two side portions formed integral and contiguous with the raised center portion, and the fastener may be described as having a flattened head and a shaft extending there from. As described in more detail below, the flattened head of the fastener is configured to slidably engage with the raised center portion of the bracket, such that once engaged and used to hang an article on a wall or other mounting surface, the mounting device may prevent the wall-mounted article from deviating from a desired orientation (i.e., may prevent the wall-mounted article from becoming crooked) once hung. To enable such engagement, embodiments of the bracket disclosed herein may be provided with a notched opening extending from a bottom edge of the raised center portion toward a mid-point of the raised center portion.

When the flattened head of the fastener is slidably engaged with the raised center portion of the bracket, the shaft of the fastener extends out through the notched opening of the raised center portion. The notched opening in the raised center portion of the bracket may be generally configured for receiving and guiding the shaft of the fastener as the flattened head of the fastener is slid underneath the raised center portion. In order to receive the shaft of the fastener, a diameter of the notched opening may be slightly larger than a diameter of the shaft of the fastener. To guide the shaft of the fastener, the diameter of the notched opening may be substantially consistent along a majority of a length of the notched opening. In some embodiments, the fastener may be a nail having two shafts extending from the flattened head, and the bracket may include a pair of notched openings, each configured for receiving and guiding the two shafts of the nail when the flattened head of the nail is slid underneath the raised center portion of the bracket.

In one embodiment, a lower surface of the raised center portion of the bracket may be elevated above a lower surface of the two side portions. The raised center portion of the bracket may be provided with a first pair of opposing sidewalls, and the flattened head of the fastener may be provided with a second pair of opposing sidewalls. When the flattened head of the fastener is slidably engaged with the raised center portion of the bracket, each one of the second pair of opposing sidewalls may be arranged adjacent and parallel to a respective one of the first pair of opposing sidewalls. This configuration prevents the bracket from pivoting around the fastener to increase the likelihood that the wall-mounted article will remain in the desired orientation once hung.

The upper surface of the flattened head of the nail and the lower surface of the raised center portion of the bracket may be provided with a variety of different shapes. In some embodiments, the upper surface of the flattened head and the lower surface of the raised center portion may be provided with substantially identical quadrilateral shapes; although they are not strictly limited to quadrilateral shapes. In some exemplary embodiments, the upper surface of the flattened head and the lower surface of the raised center portion may be provided with square, rectangular or parallelogram shapes. In such embodiments, opposing sidewalls of the first pair of opposing sidewalls of the raised center portion may be parallel to one another, and opposing sidewalls of the second pair of opposing sidewalls of the flattened head may be parallel to one another. In other exemplary embodiments, the upper surface of the flattened head and the lower surface of the raised center portion may be provided with various trapezoidal shapes. In such embodiments, opposing sidewalls of the first pair of opposing sidewalls of the raised center portion may not be parallel to one another, and opposing sidewalls of the second pair of opposing sidewalls of the flattened head may not be parallel to one another.

In some embodiments, the flattened head of the fastener may include a pair of notched openings. In such embodiments, each of the notched openings in the flattened head of the fastener may be arranged proximate to a respective one of the second pair of opposing sidewalls of the flattened head to form a pair of side prong members, which may be compressed prior to slidably engaging the flattened head of the fastener with the raised center portion of the bracket. In doing so, the side prong members may apply an outward force against the first pair of opposing sidewalls of the raised center portion to secure the flattened head of the fastener within the raised center portion of the bracket. In some embodiments, each side prong member may include a projection arranged proximate to a distal end of the side prong member to increase the amount of outward force applied by the side prong member at the distal end. In some embodiments, each side prong member may include one or more notched openings or teeth, which may engage with a complementary set of one or more notched openings or teeth provided on the first pair of opposing sidewalls of the raised center portion of the bracket to at least temporarily lock the flattened head of the fastener within the raised center portion of the bracket.

According to one embodiment, the mounting device described herein may be provided separate from an article (referred to herein as a wall-mounted article) to be mounted or hung on a wall or other mounting surface. According to another embodiment, a wall-mounted article comprising at least one of the mounting device embodiments described herein may be provided herein. In such an embodiment, the at least one mounting device may be pre-installed on a rear surface of the wall-mounted article, or may be provided separately for subsequent installation by the consumer.

According to another embodiment, a method is provided herein for hanging an article (i.e., a wall-mounted article) on a wall or other mounting surface via the mounting device described herein. In some embodiments, the method may include sliding the flattened head of the nail described herein underneath the raised center portion of the bracket described herein, such that the flattened head of the nail engages with the raised center portion of the bracket and the shaft of the nail extends out through the notched opening of the bracket. While gripping opposing edges of the wall-mounted article, the shaft of the nail may be pushed into the wall to hang the wall-mounted article at a desired location and a desired orientation on the wall or other mounting surface. Because opposing sidewalls of the flattened head of the nail are positioned adjacent and parallel to opposing sidewalls of the raised center portion of the bracket when the flattened head of the nail is engaged with the raised center portion of the bracket, the mounting device and method provided herein prevents the bracket (and thus, the wall-mounted article) from pivoting around the nail. As a consequence, the disclosed mounting device may substantially prevent the wall-mounted article from deviating from a desired orientation after the wall-mounted article is hung.

In some embodiments, the article may include a plurality of mounting devices affixed to a rear surface of the article, where each mounting device includes a specially configured bracket and nail, as described herein. In such embodiments, the method may include repeating the step of sliding the flattened head of the nail underneath the raised center portion of the bracket for each mounting device prior to pushing the shafts of the nails into the mounting surface to hang the article on the wall or other mounting surface at the desired location and orientation. Compared to embodiments which use only one mounting device, embodiments of the method that use a plurality of mounting devices to hang the wall-mounted article may ensure that the wall-mounted article does not deviate from the desired orientation after the wall-mounted article is hung.

In some embodiments, one or more steps may be performed prior to sliding the flattened head of the nail underneath the raised center portion of the bracket. For example, the method may include affixing the bracket to a rear surface of the wall-mounted article prior to sliding the flattened head of the nail underneath the raised center portion of the bracket, if the bracket was not pre-installed. In some cases, the flattened head of the nail may include a pair of side prong members, as described above. In such cases, the method may include compressing the side prong members prior to sliding the flattened head of the nail underneath the raised center portion of the bracket. Once compressed and engaged with opposing sidewalls of the raised center portion, the side prong members may apply an outward force against the opposing sidewalls of the raised center portion to secure the flattened head of the nail within the raised center portion of the bracket.

BRIEF DESCRIPTION OF THE DRAWINGS

Other objects and advantages of the invention will become apparent upon reading the following detailed description and upon reference to the accompanying drawings.

FIG. 1 is a three-dimensional (3D) perspective view illustrating one embodiment of a bracket included with the mounting device described herein;

FIG. 2 is a top view of the bracket shown in FIG. 1;

FIG. 3 is a side view of the bracket shown in FIG. 1;

FIG. 4 is a bottom view of the bracket shown in FIG. 1;

Figure 5:
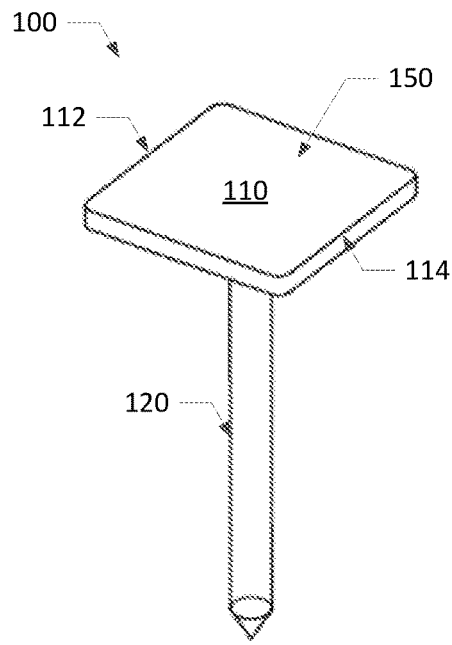
FIG. 5 is a 3D perspective view illustrating one embodiment of a nail that may be included with the mounting device described herein.

While the present disclosure is susceptible to various modifications and alternative forms, specific embodiments thereof are shown by way of example in the drawings and will herein be described in detail. It should be understood, however, that the drawings and detailed description thereto are not intended to limit the present disclosure to the particular form disclosed, but on the contrary, the intention is to cover all modifications, equivalents and alternatives falling within the spirit and scope of the present disclosure as defined by the appended claims.

DETAILED DESCRIPTION OF THE
PREFERRED EMBODIMENTS

Figure 16A:
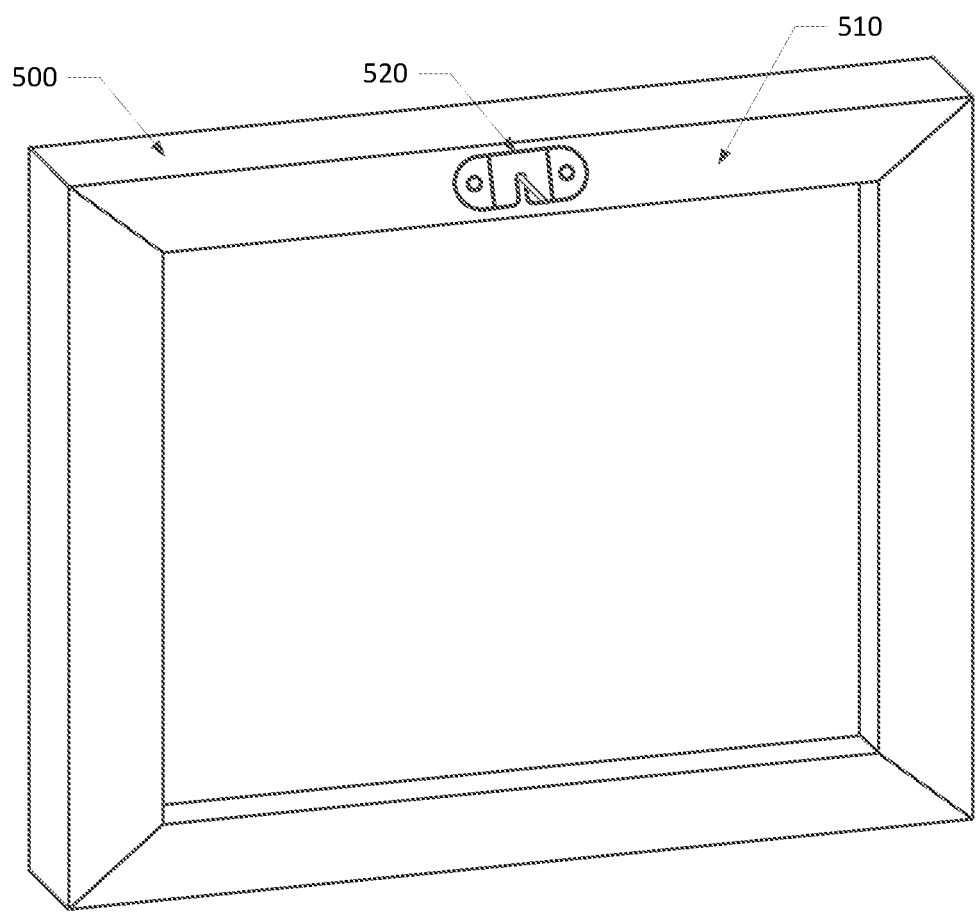
FIG. 16A is a 3D perspective view illustrating one embodiment of a wall-mounted article including at least one mounting device described herein.
Figure 16B:
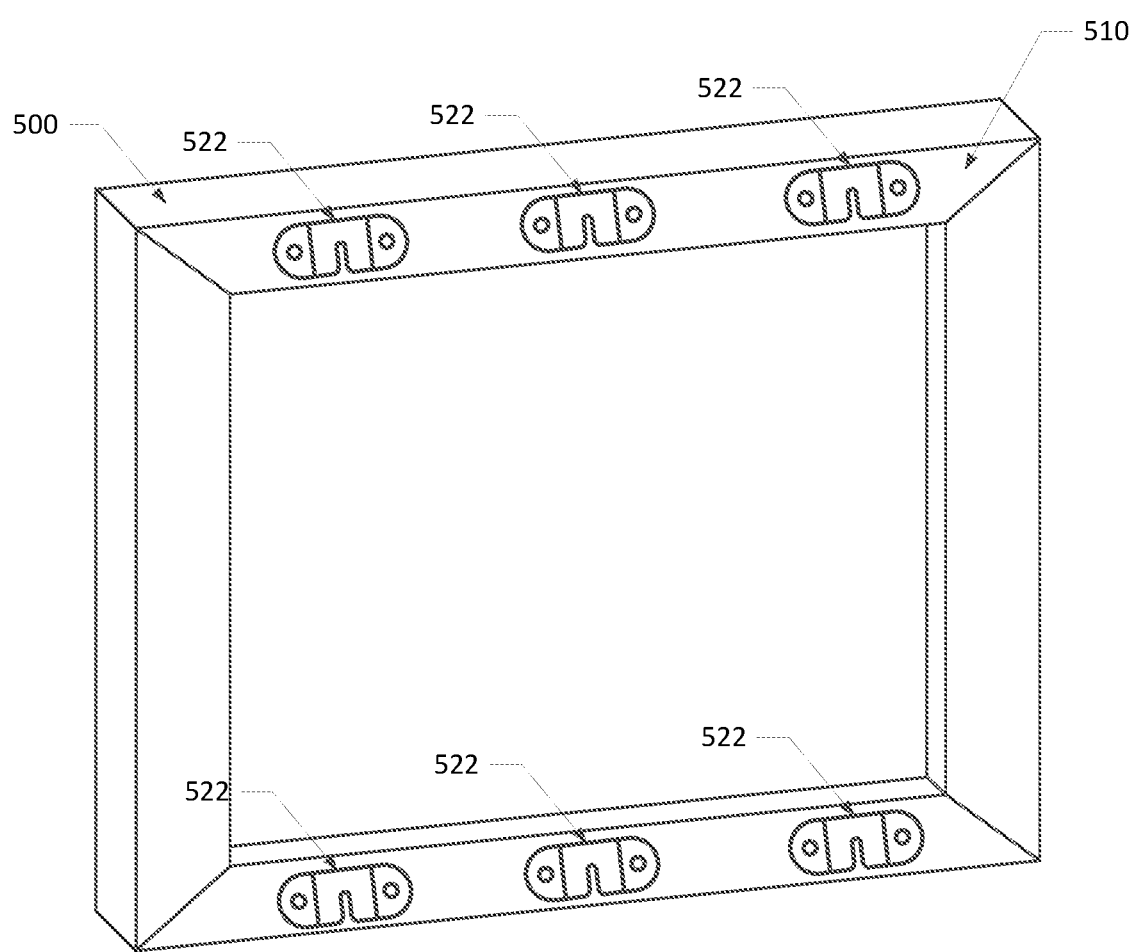
FIG. 16B is a 3D perspective view illustrating one embodiment of a wall-mounted article including a plurality of mounting devices described herein.
Figure 16C:
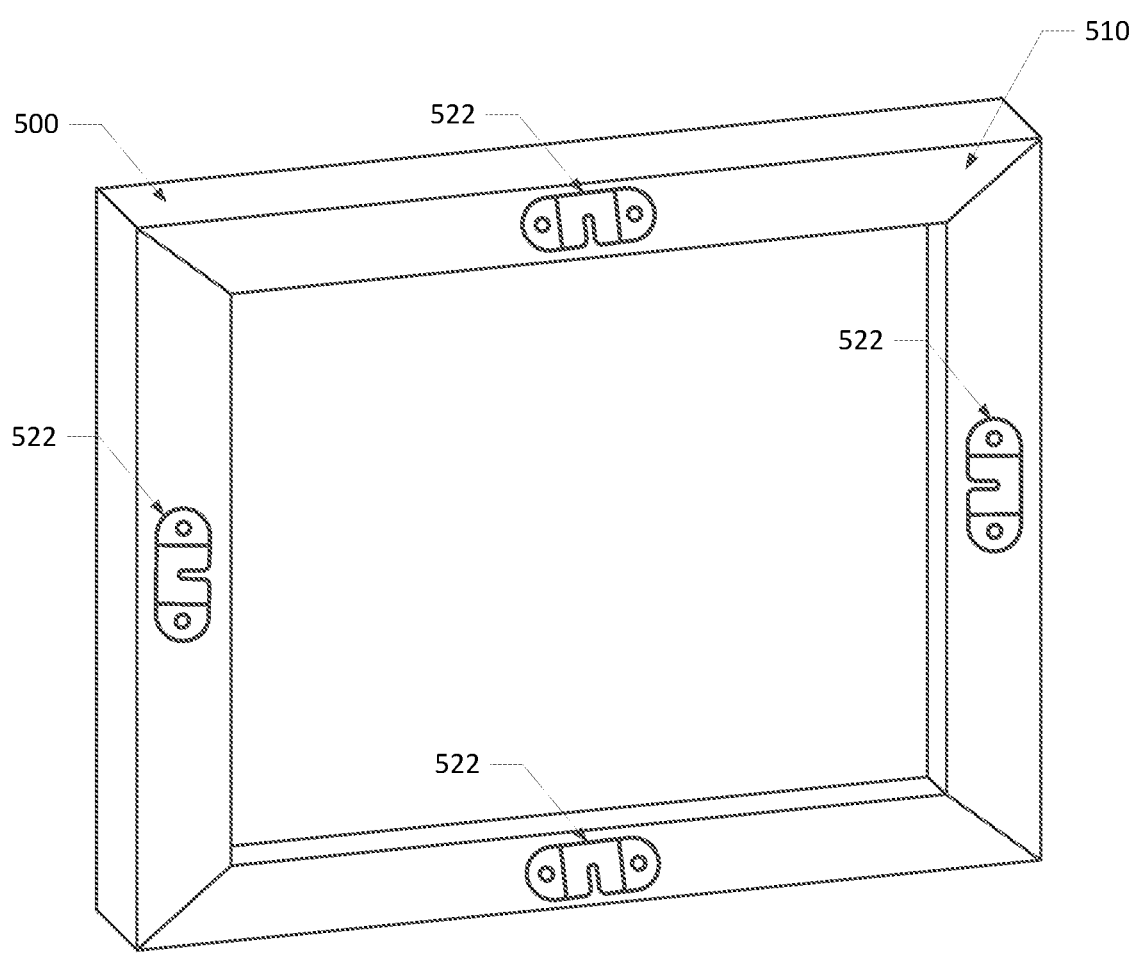
FIG. 16C is a 3D perspective view illustrating another embodiment of a wall-mounted article including a plurality of mounting devices described herein.

Generally speaking, the present disclosure provides various embodiments of a mounting device that may be used for mounting or hanging wall-mounted articles on a wall or other substantially vertical surface. Although embodiments of mounting device(s) are illustrated in FIGS. 16A-16C as affixed to a rear surface of a picture frame, the mounting device embodiments described herein may be used for hanging a wide variety of wall-mounted articles, including, but not limited to, picture frames, mirrors, art, bulletin boards, signs, clocks and other wall-mounted articles. Although some embodiments are intended for hanging articles on interior walls of a building or residence, the mounting device described herein is not so limited, and may be used to hang articles on other suitable indoor surfaces (such as, e.g., cubicle walls) or outdoor surfaces (such as, e.g., exterior wooden walls, pillars or posts).

In all embodiments shown and described herein, the disclosed mounting device enables an article to be mounted or hung on a wall, or another mounting surface, at a desired location and orientation, and in some embodiments, prevents the wall-mounted article from deviating from the desired orientation once it is hung. Even in embodiments in which a single mounting device is used to provide a single point of attachment to the wall or mounting surface, the mounting devices described herein prevent the wall-mounted article from rotating or pivoting around the single point of attachment (i.e., prevents the article from becoming "crooked") when the article or the wall upon which the article is mounted is disturbed (e.g., due to dusting, people or animals bumping into the wall, doors being slammed, etc.).

In some embodiments, at least a portion of the mounting devices described herein (e.g., the bracket portion) may be pre-installed on a rear surface of an article to be hung or mounted on a wall (i.e., a wall-mounted article). In other embodiments, the mounting devices described herein may be provided along with a wall-mounted article, so that a consumer may install the mounting device where he/she so chooses. In yet other embodiments, the mounting devices described herein may be provided separately from a wall-mounted article, thereby enabling the consumer to use the mounting device for hanging substantially any suitable wall-mounted article.

In most embodiments, the mounting device described herein includes a specially configured bracket and fastener (e.g., a specially configured nail or screw). In general, the bracket disclosed herein may include a raised center portion arranged between two side portions, which are formed integral and contiguous with the raised center portion, and the disclosed fastener may include an enlarged, flattened head with at least one shaft extending there from. As used herein, the term "fastener" may refer to a specially configured nail, as shown in FIGS. 5-15A, 15C, 18A and 18B or a specially configured screw as depicted in FIG. 15B. As set forth in more detail below, the flattened head of the fastener may be configured to slidably engage with the raised center portion of the bracket, such that once engaged and used to hang an article on a wall, the mounting device prevents the bracket from pivoting around the fastener. As a consequence, the mounting device may prevent the wall-mounted article from deviating from the desired orientation (i.e., prevent the wall-mounted article from becoming crooked) once hung.

As used herein, the term "slidably engaged" means that the flattened head of the fastener is slid underneath the raised center portion of the bracket to engage with the raised center portion. When the bracket is affixed to a rear surface of a wall mounted article, and the flattened head of the fastener is "slidably engaged" with the raised center portion, the flattened head of the fastener may be sandwiched between a lower surface of the raised center portion and the rear surface of the wall-mounted article.

As described in more detail below, the flattened head of the fastener may be generally shaped and dimensioned, so as to engage with (or substantially contact) one or more surfaces of the raised center portion of the bracket when the flattened head of the fastener is "slidably engaged" with the raised center portion. For example, the flattened head of the fastener may have a shape similar to, yet be dimensioned slightly smaller than, a lower surface of the raised center portion of bracket, so that when the flattened head of the fastener is slid underneath the lower surface of the raised center portion, opposing sidewalls of the flattened head of the fastener are arranged adjacent and parallel to opposing sidewalls of the raised center portion. FIGS. 8-11 (discussed in more detail below) provide various examples of shapes that may be considered for the flattened head of the fastener and raised center portion of the bracket disclosed herein.

Turning now to the drawings, FIGS. 1-4 illustrate one embodiment of a bracket 10 that may be included with the mounting device described herein. In particular, FIG. 1 provides a 3D perspective view, FIG. 2 provides a top view, FIG. 3 provides a side view, and FIG. 4 provides a bottom view of bracket 10. As shown in FIGS. 1-4, bracket 10 includes a raised center portion 20 arranged between two side portions 30 and 40, which are formed integral and contiguous with the raised center portion, and a notched opening 50 extending from a bottom edge 21 of the raised center portion toward a top edge 22 of the raised center portion.

The raised center portion 20 of bracket 10 includes an upper surface 24 and a lower surface 25. As shown in FIGS. 1 and 3, the lower surface 25 of raised center portion 20 is raised or elevated above a lower surface 60 of side portions 30 and 40. This creates a space beneath the lower surface 25 of raised center portion 20 for receiving a flattened head of a nail or screw, as shown in the example embodiments of FIGS. 15A-15C and discussed below. As shown in FIGS. 3 and 4, the raised center portion 20 of the bracket comprises a first pair of opposing sidewalls 26 and 27 connecting the lower surface 25 of the raised center portion 20 to the lower surface 60 of the side portions 30 and 40. As described in more detail below in reference to FIGS. 8-11, the opposing sidewalls 26 and 27 of raised center portion 20 may be configured to align with opposing sidewalls of the flattened head of the disclosed fastener (e.g., a nail as shown in FIGS. 5-15A, 18A, 18B or screw as shown in FIG. 15B) to secure the flattened head within the raised center portion 20 of the bracket 10. This prevents bracket 10 from pivoting around the fastener, and as a consequence, may prevent the wall-mounted article from deviating from a desired orientation once hung.

The notched opening 50 formed within raised center portion 20 is generally dimensioned to receive a shaft of the fastener when the flattened head of the fastener is slidably engaged with the raised center portion. As shown in FIG. 2, notched opening 50 may extend from a bottom edge 21 and terminate near a mid-point 23 of the raised center portion 20. In some embodiments, the diameter ($D_{notch}$) of the notched opening 50 may be substantially consistent along a majority of the length ($L_{notch}$) of the notched opening, and may be slightly larger (e.g., about 10-40%) than a diameter of the shaft of the fastener. In such embodiments, the sidewalls 52 of the notched opening 50 may function to guide the shaft of the fastener within the notched opening as the flattened head of the fastener is slidably engaged with the raised center portion 20. As described in more detail below with respect to FIG. 15A, the terminus of notched opening 50 may rest upon the shaft of the fastener when the flattened head of the fastener is fully engaged with the raised center portion 20 of the bracket 10. In some embodiments, more than one notched opening may be formed within the raised center portion of the bracket for receiving more than one shaft of a nail, as shown, e.g., in FIG. 15C.

Side portions 30 and 40 of bracket 10 respectively include apertures 35 and 45 through which additional screws, nails, etc., may be used to affix bracket 10 to a rear surface of a wall-mounted article. Although side portions 30 and 40 are illustrated as having a substantially curved or rounded perimeter, the side portions are not so limited, and may be configured in alternative embodiments with substantially any perimeter shape and size. As noted above, side portions 30/40 are formed integral and contiguous with the raised center portion 20 of bracket 10. In other words, side portions 30/40 and raised center portion 20 are formed as one integral component. In one embodiment, bracket 10 may be formed by stamping, cutting, or etching an outline of the bracket from a metal sheet or plate to extract a flattened shape of the bracket, and by bending the flattened shape along lines 28 and 29 to form raised center portion 20. In another embodiment, bracket 10 may be formed using a mold or die cast method.

Bracket 10 may be formed in a variety of different sizes to accommodate mounting different shapes, sizes and weights of wall-mounted articles. As shown in FIGS. 2-4, bracket 10 may be generally described as having a length ($L_{bracket}$) extending along an axis 60 of the bracket, a width ($W_{bracket}$) extending along an axis 70 of the bracket, and a thickness ($T_{bracket}$) extending through the bracket. As shown in FIG. 2, axis 60 and axis 70 are perpendicular axes, which lie in a plane parallel to upper surface 24 of raised center portion 20 and pass through mid-point 23 of raised center portion 20 to respectively bisect the width and length of raised center portion 20. In one embodiment, bracket 10 may have a length of about 1 inch (about 25.4 mm), a width of about 0.4 inches (about 10.15 mm) and a thickness of about 0.03 inches (about 0.8 mm). In such an embodiment, the raised center portion 20 of the bracket 10 may have a length of about 0.4 inches (about 10.15 mm), a width of about 0.4 inches (about 10.15 mm) and a thickness of about 0.03 inches (about 0.8 mm). The notched opening 50 in the raised center portion 20 may also be described as having a length ($L_{notch}$) and a diameter ($D_{notch}$). In one embodiment, the notched opening 50 may have a length of about 0.45 inches and a diameter of about 0.07 inches.

It is noted, however, that bracket 10 is not limited to the exemplary dimensions described above and may be configured with substantially smaller and/or larger lengths, widths and/or thicknesses, in other embodiments. For example, bracket 10 may be configured with substantially smaller dimensions when intended for mounting relatively smaller and/or lighter articles, and may be configured with substantially larger dimensions when intended for mounting relatively larger and/or heavier articles. As such, bracket 10 may be provided with a variety of lengths ranging between about 1 inches and about 2 inches, a variety of widths ranging between about 0.375 inches and about 0.75 inches, and a variety of thicknesses ranging between about 0.02 inches and about 0.04 inches, for mounting different shapes, sizes and weights of wall-mounted articles. Likewise, raised center portion 20 of bracket 10 may also be provided with a variety of lengths ranging between about 0.35 inches and about 0.75 inches, a variety of widths ranging between about 0.35 inches and about 0.75 inches, and a variety of thicknesses ranging between about 0.02 inches and about 0.04 inches. Similarly, the notched opening 50 may have a variety of lengths ranging between about 0.4 inches to about 0.8 inches and a variety of diameters ranging between about 0.04 inches to about 0.07 inches.

Figure 6:
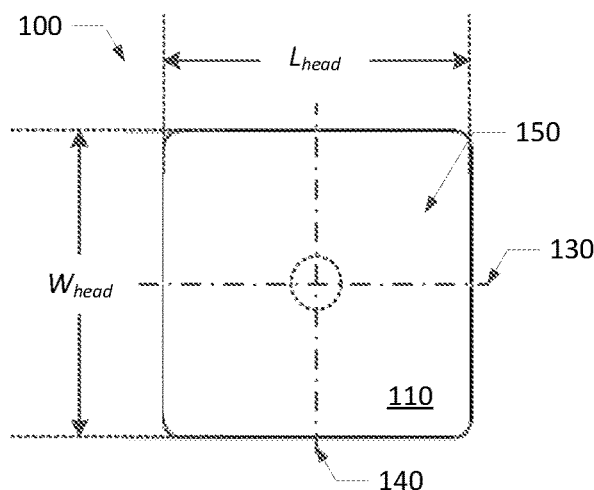
FIG. 6 is a top view of the nail shown in FIG. 5.
Figure 7:
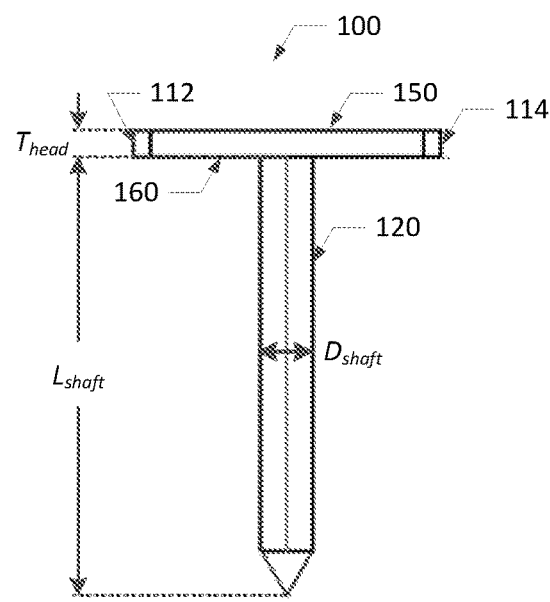
FIG. 7 is a side view of the nail shown in FIG. 5.

FIGS. 5-7 illustrate one embodiment of a fastener (i.e., a nail) 100 that may be included with the mounting device described herein. In particular, FIG. 5 provides a 3D perspective view, FIG. 6 provides a top view, and FIG. 7 provides a side view of nail 100. As shown in FIGS. 5-7, nail 100 includes a flattened head 110 and a single shaft 120 extending there from. In other embodiments (shown, e.g., in FIG. 15C), the nail shown in FIG. 5 may have more than one shaft.

As noted above, the flattened head 110 of nail 100 is configured to slidably engage with the raised center portion 20 of bracket 10. To slidably engage with the raised center portion 20, flattened head 110 is slid underneath raised center portion 20, such that the flattened head is sandwiched between the lower surface 25 of the raised center portion 20 and a rear surface of the wall-mounted article. When slidably engaged, the shaft 120 of the nail 100 passes through and extends out of the notched opening 50 of the bracket 10. In the embodiment shown in FIG. 5, nail 100 is illustrated as having a substantially smooth, straight shaft 120 without any threads.

In some instances, the substantially smooth, straight shaft 120 of nail 100 may allow the nail to rotate around the insertion point (i.e., the point at which shaft 120 is inserted into a wall or other mounting surface), possibly allowing a wall-mounted article to become crooked if only one mounting device is provided on the rear surface of the wall-mounted article. In other embodiments (shown in FIG. 15B), nail 100 may instead be implemented as a screw having a flattened head and a shaft comprising substantially any number and size of threads. When a screw is inserted into the wall, the threaded shaft of the screw grips the wall material and prevents the screw from rotating around the insertion point. As such, embodiments of the mounting device described herein that combine a screw having a flattened head with the bracket 10 shown, e.g., in FIGS. 1-4 may ensure that a wall-mounted article does not deviate from a desired orientation once hung, even when only one mounting device is provided on the rear surface of the wall-mounted article.

In some embodiments, the flattened head 110 and shaft 120 of the nail 100 may be fabricated from a single material (e.g., a metal, such as but not limited to, steel, stainless steel, aluminum, copper, brass, bronze, zinc, iron) and formed as one integral component. In other embodiments, the flattened head 110 and shaft 120 may be formed as separate components, which are coupled together to form nail 100. In such embodiments, flattened head 110 and shaft 120 may be fabricated from the same material (e.g., a metal) or from different materials. In one example, shaft 120 may be fabricated from a metal material (such as steel, stainless steel, aluminum, copper, brass, bronze, zinc, iron, etc.) and flattened head 110 may be a hard plastic material (such as, e.g., Acrylonitrile Butadiene Styrene, ABS) formed around or coupled to an upper end of the shaft.

The flattened head 110 and shaft 120 of nail 100 may be formed in a variety of different shapes and sizes to accommodate different shapes and sizes of bracket 10, as well as to accommodate mounting different shapes, sizes and weights of wall-mounted articles. As shown in FIGS. 6-7, for example, the flattened head 110 of nail 100 may be described as having a length ($L_{head}$) extending along an axis 130 of the nail head, a width ($W_{head}$) extending along an axis 140 of the nail head, and a thickness ($T_{head}$) extending through the nail head. As shown most clearly in FIG. 6, axis 130 and axis 140 are perpendicular axes, which lie in a plane parallel to the upper surface of flattened head 110 and pass through a center point of the flattened head to respectively bisect the width and length of the flattened head. In one exemplary embodiment, flattened head 110 may have a length and width of about 0.35 inches (about 8.9 mm) and a thickness of about 0.03 inches (about 0.8 mm). The shaft 120 of the nail 100 may be described as having a length ($L_{shaft}$) and diameter ($D_{shaft}$). In one exemplary embodiment, shaft 120 may have a length of about 0.5 inches (about 12.7 mm) and a diameter of about 0.06 inches (about 1.6 mm).

It is noted, however, that nail 100 is not limited to the exemplary dimensions discussed above, and may be configured with substantially smaller and/or larger lengths, widths, thicknesses and/or diameters, in other embodiments. For example, nail 100 may be configured with substantially smaller dimensions when intended for mounting smaller and/or lighter articles, and may be configured with substantially larger dimensions when intended for mounting larger and/or heavier articles. As such, flattened head 110 may be provided with a variety of lengths ranging between about 0.35 inches and about 0.6 inches, a variety of widths ranging between about 0.35 inches and about 0.6 inches, and a variety of thicknesses ranging between about 0.02 inches and about 0.04 inches for mounting different sizes and shapes of wall-mounted articles. Likewise, shaft 120 may be provided with a variety of lengths ranging between about 0.6 inches and about 0.8 inches, and a variety of diameters ranging between about 0.03 inches and about 0.06 inches for mounting different sizes and shapes of wall-mounted articles.

All nails, to some extent, may be described as having a flattened head. As used herein, however, the term "flattened head" means that the flattened head 110 has: (a) a planar upper surface 150 and a planar lower surface 160 substantially parallel to the planar upper surface 150, (b) a diameter (e.g., $L_{head}$ or $W_{head}$) approximately 10 to 20 times larger than the diameter ($D_{shaft}$) of the shaft 120, and (c) a thickness ($T_{head}$) between approximately 5% and 10% of the diameter of the flattened head. In addition, the flattened head 110 of the nail 100 may be specifically dimensioned, so that when the flattened head is slidably engaged with the raised center portion 20 of the bracket 10, one or more surfaces of the flattened head engage with (or substantially contact) one or more surfaces of the raised center portion of the bracket.

Figure 8:
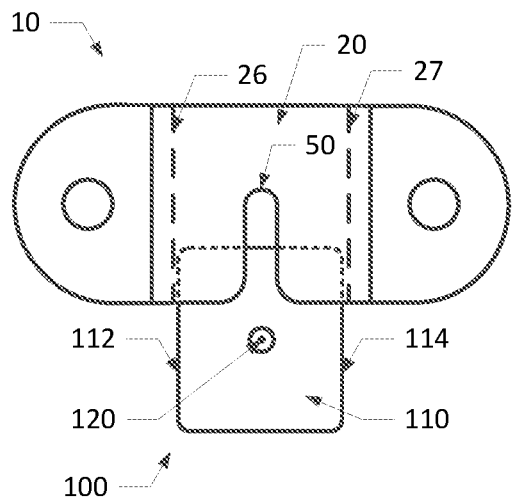
FIG. 8 is a top view of the bracket shown in FIG. 1 and a bottom view of the nail shown in FIG. 5.

As shown in FIGS. 5 and 7, for example, flattened head 110 includes a pair of opposing sidewalls 112 and 114, which are configured to align with the opposing sidewalls 26 and 27 of the raised center portion 20 of the bracket 10 to secure the flattened head within the raised center portion 20 of the bracket. FIG. 8 provides a top view of bracket 10 and a bottom view of nail 100, depicting the flattened head 110 of the nail 100 engaging with the raised center portion 20 of the bracket 10. As flattened head 110 is slid underneath raised center portion 20, the opposing sidewalls 112 and 114 of the flattened head 110 align with the opposing sidewalls 26 and 27 of the raised center portion 20. When the shaft 120 of the nail 100 is fully seated within the notched opening 50 of the bracket, each opposing sidewall 112 and 114 of the flattened head 110 is arranged adjacent and parallel to a respective one of the opposing sidewalls 26 and 27 of the raised center portion 20. This prevents significant rotational movement of the bracket 10 around the nail 100 to ensure that the wall-mounted article remains positioned in the desired orientation.

In general, the upper surface 150 of the flattened head 110 of the nail 100 and the lower surface 25 of the raised center portion 20 of the bracket 10 may be formed to include substantially identical quadrilateral shapes. In the exemplary embodiments shown in FIGS. 1-8, the flattened head 110 of the nail 100 and the raised center portion 20 of the bracket 10 are depicted as substantially rectangular in shape. It is noted, however, that flattened head 110 and raised center portion 20 are not strictly limited to rectangular shapes, and may be alternatively provided with a variety of different shapes and/or sizes. Regardless of the particular shape chosen, each opposing sidewall 112 and 114 of the flattened head 110 is preferably configured so that it is parallel to a respective opposing sidewall 26 and 27 of the raised center portion 20 when engaged. This enables flattened head 110 to be slid underneath raised center portion 20 without impediment, and enables the flattened head to be held securely in place. However, there is no requirement that opposing sidewalls 112 and 114 of the flattened head 110 be parallel to one another, or that opposing sidewalls 26 and 27 of the raised center portion 20 be parallel to one another. This means that quadrilateral shapes (other than parallelograms) can be used to form flattened head 110 and raised center portion 20 without departing from the scope of the present disclosure.

Figure 9:
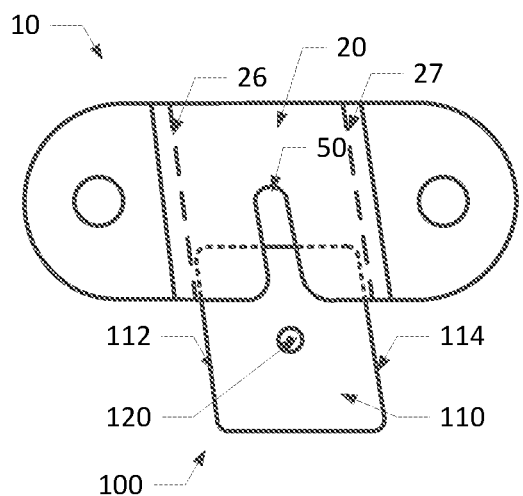
FIG. 9 is a top view of a bracket and a bottom view of a nail that may be included with the mounting device described herein, according to another embodiment.
Figure 10:
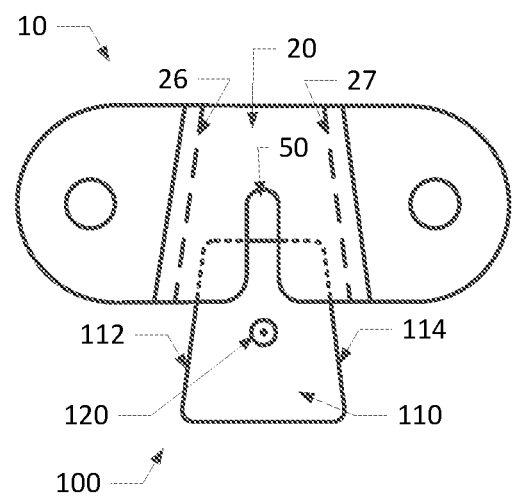
FIG. 10 is a top view of a bracket and a bottom view of a nail that may be included with the mounting device described herein, according to another embodiment.
Figure 11:
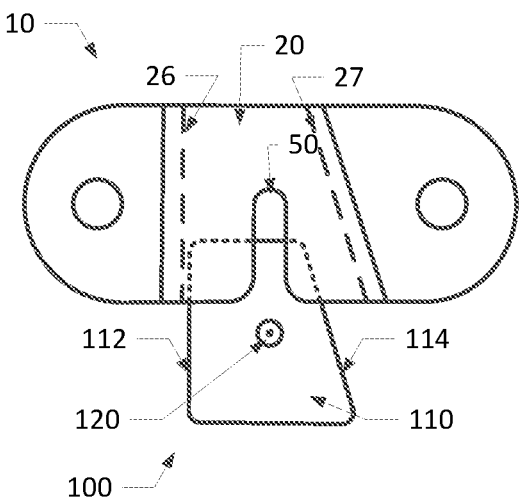
FIG. 11 is a top view of a bracket and a bottom view of a nail that may be included with the mounting device described herein, according to another embodiment.

FIGS. 8-11 illustrate various embodiments of the present disclosure, in which the flattened head 110 of the nail 100 and the raised center portion 20 of the bracket 10 are formed to include a variety of different quadrilateral shapes. As noted above, flattened head 110 of the nail 100 and the raised center portion 20 of the bracket 10 comprise rectangular shapes in the embodiment shown in FIG. 8. In FIG. 9, flattened head 110 and raised center portion 20 are each depicted as parallelograms. In FIG. 10, flattened head 110 and raised center portion 20 are each depicted as trapezoids. Another trapezoidal shape (different from FIG. 10) is depicted in FIG. 11 for the flattened head 110 and raised center portion 20.

FIGS. 8-9 illustrate embodiments in which the opposing sidewalls 112 and 114 of the flattened head 110 are parallel to one another, and the opposing sidewalls 26 and 27 of the raised center portion 20 of the bracket 10 are parallel to one another. On the other hand, FIGS. 10-11 illustrate embodiments in which the opposing sidewalls 112 and 114 of the flattened head 110 are not parallel to one another (in this case, they are convergent), and the opposing sidewalls 26 and 27 of the raised center portion 20 of the bracket 10 are also not parallel to one another (again, they are convergent).

Figure 12:
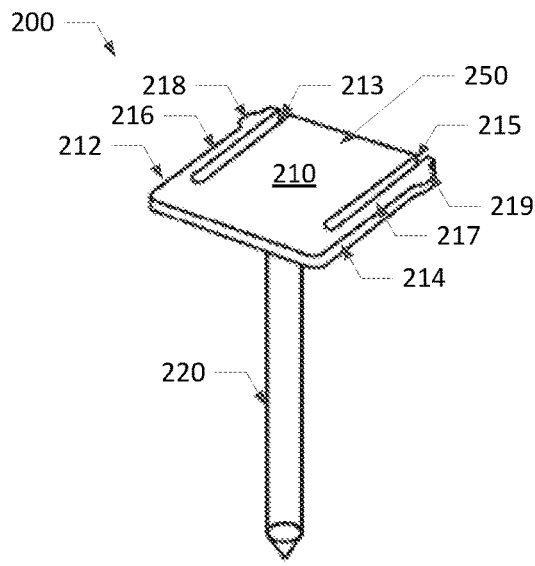
FIG. 12 is a 3D perspective view illustrating another embodiment of a nail that may be included with the bracket shown in FIGS. 1-4 and 8.
Figure 13:
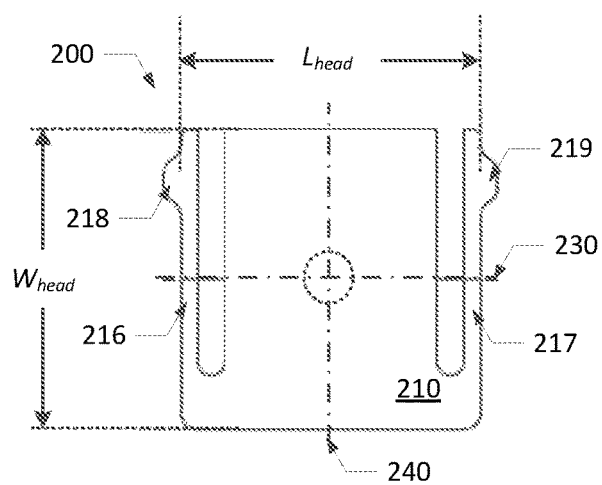
FIG. 13 is a top view of the nail shown in FIG. 12.
Figure 14:
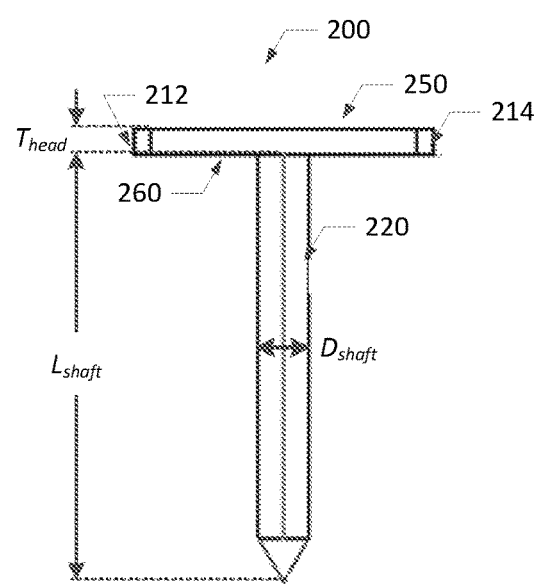
FIG. 14 is a side view of the nail shown in FIG. 12.

FIGS. 12-14 illustrate an alternative embodiment of a fastener (i.e., a nail) 200 that may be provided along with the bracket 10 shown in FIGS. 1-4 and 8. In particular, FIG. 12 provides a 3D perspective view, FIG. 13 provides a top view, and FIG. 14 provides a side view of nail 200. Like the previous embodiment of the nail 100 shown in FIGS. 5-7, nail 200 generally includes a flattened head 210 and a shaft 220 extending from the flattened head 210, as discussed above. The flattened head 210 of nail 200 generally includes a pair of opposing sidewalls 212/214, a planar upper surface 250 and a planar lower surface 260, as discussed above. Although illustrated in FIGS. 12-14 as having a single shaft 220, nail 200 may be configured with more than one shaft in other embodiments (shown, e.g., in FIG. 15C).

In some embodiments, the flattened head 210 and shaft 220 of the nail 200 may be dimensioned similar to the flattened head 110 and shaft 120 of nail 100. In other embodiments, flattened head 210 and/or shaft 220 may be dimensioned substantially different from that previously described. In one example embodiment, flattened head 210 may have a length ($L_{head}$) of about 0.39 inches (about 9.9 mm), a width ($W_{head}$) of about 0.35 inches (about 8.9 mm) and a thickness ($T_{head}$) of about 0.019 inches (about 0.5 mm). In such an embodiment, the slightly larger length (9.9 mm vs 8.9 mm) and slightly smaller thickness (0.5 mm vs 0.8 mm) of nail 200 may enable the side prong members 216 and 217 (discussed below) of nail 200 to be compressed.

Unlike the nail 100 shown in FIGS. 5-7, the flattened head 210 of the nail 200 shown in FIGS. 12-14 includes a pair of notched openings 213 and 215, each arranged proximate to a respective one of the opposing sidewalls 212 and 214 to form a pair of side prong members 216 and 217. Side prong members 216 and 217 are configured to be compressed by the user prior to slidably engaging the flattened head 210 of nail 200 with the raised center portion 20 of the bracket 10. When the flattened head 210 is fully engaged with the raised center portion 20 of the bracket, side prong members 216 and 217 provide an outward force against the opposing sidewalls 26 and 27 of the raised center portion 20 to secure the flattened head 210 of nail 200 within the raised center portion of the bracket. In some embodiments (shown in FIGS. 12 and 13), each side prong member 216 and 217 may include a projection 218 and 219 arranged proximate to a distal end of the side prong member to increase the amount of outward force provided by the side prong member at the distal end.

Figure 18A:
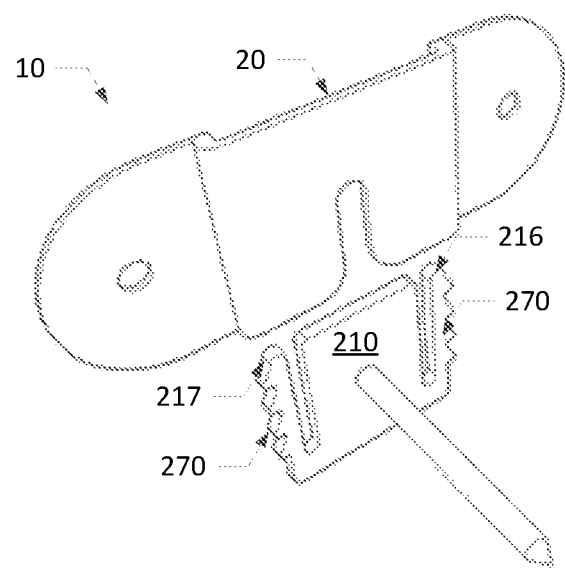
FIG. 18A is a 3D front perspective view of a bracket and a 3D rear perspective view of a nail that may be included with the mounting device described herein, according to another embodiment.
Figure 18B:
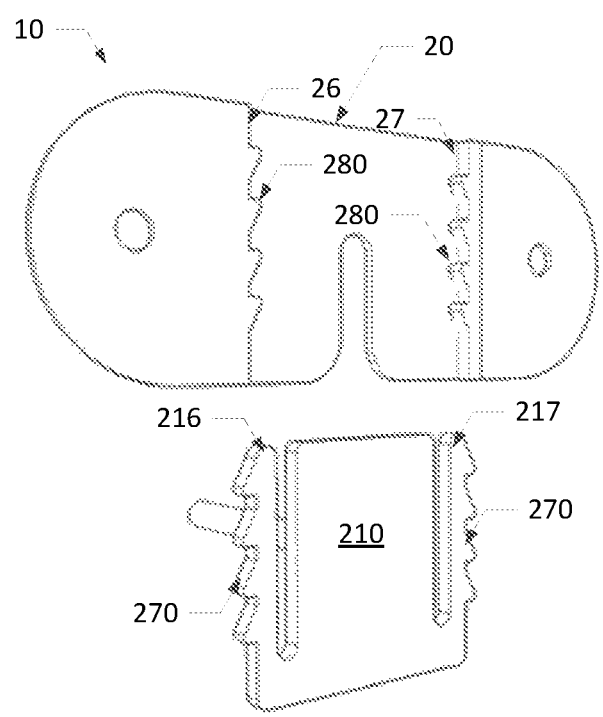
FIG. 18B is a 3D rear perspective view of the bracket and a 3D front perspective view of the nail shown in FIG. 18A.

In some embodiments (shown in FIGS. 18A and 18B), each side prong member 216 and 217 may include one or more notched openings or teeth 270, which may engage with a complementary set of one or more notched openings or teeth 280 provided on the opposing sidewalls 26 and 27 of the raised center portion 20 of bracket 10 to at least temporarily lock the flattened head 210 of the nail 200 within the raised center portion of the bracket. Although FIGS. 18A and 18B illustrate four teeth 270/280 included on each side prong member 216/217 of flattened head 210 and each sidewall 26/27 of raised center portion 20, the present disclosure is not limited to such. In other embodiments, any suitable number of teeth 270/280 may be included on the side prong members 216/217 of the flattened head 210 and the sidewalls 26/27 of the raised center portion 20 without departing from the scope of the present disclosure. Once the flattened head 210 of the nail 200 is slidably engaged with the raised center portion 20 of the bracket 10 and the teeth 270/280 are engaged, the side prong members 216/217 may be compressed to disengage the teeth 270/280 and remove the flattened head of the nail from the raised center portion of the bracket.

Figure 15A:
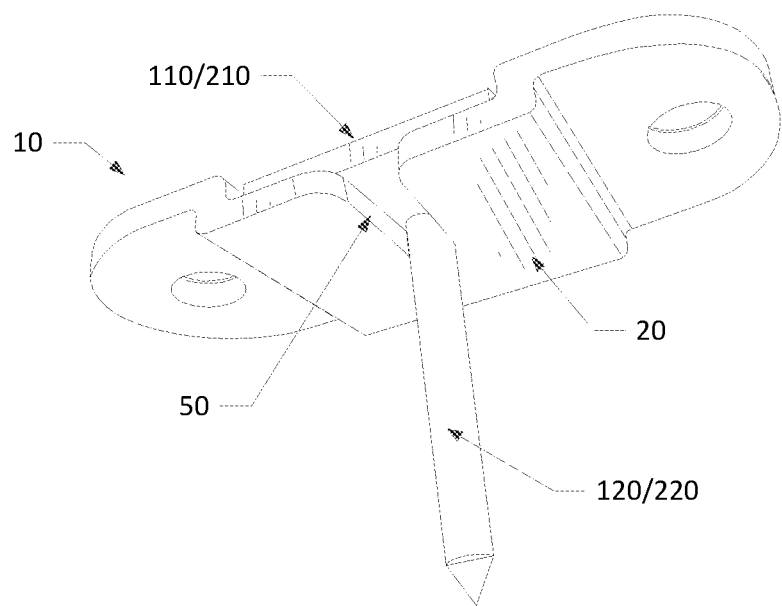
FIG. 15A is a 3D perspective view illustrating the nail shown in the embodiments of FIGS. 5-8 and 12-14 slidably engaged with the bracket shown in the embodiments of FIGS. 1-4 and 8.
Figure 15B:
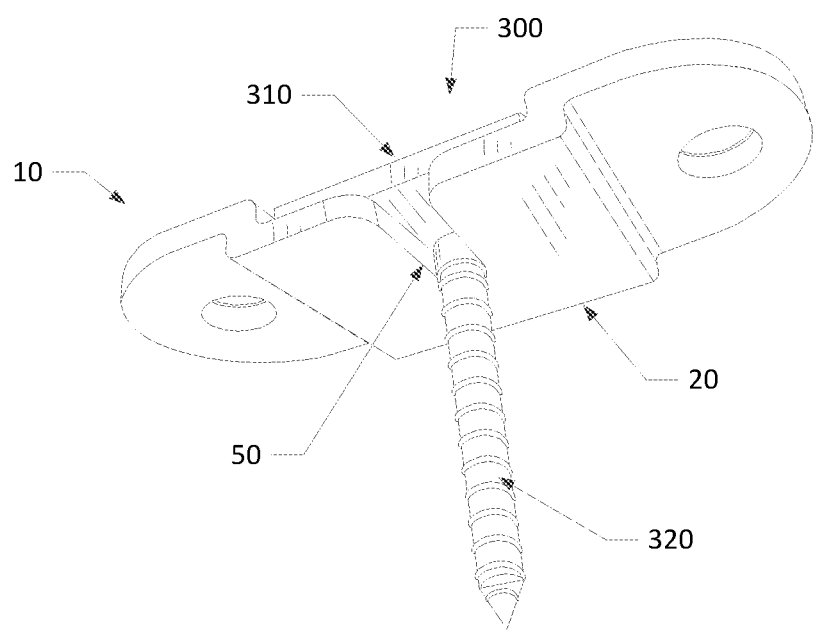
FIG. 15B is a 3D perspective view illustrating a screw slidably engaged with the bracket shown in the embodiments of FIGS. 1-4 and 8.

FIG. 15A is a 3D perspective view illustrating the nails 100/200 shown in the embodiments of FIGS. 5-8, FIGS. 12-14 and FIGS. 18A-18B slidably engaged with the bracket 10 shown in the embodiment of FIGS. 1-4 and 8. As noted above, the flattened head 110/210 of the nail 100/200 may be slidably engaged with the raised center portion 20 of the bracket 10 by sliding the flattened head underneath the raised center portion, such that the flattened head is sandwiched between the lower surface 25 of the raised center portion 20 and a rear surface of the wall-mounted article. In doing so, the shaft 120/220 of the nail 100/200 passes through and extends out of the notched opening 50 in the raised center portion 20 of the bracket 10. When the shaft 120/220 is fully seated within the notched opening 50, opposing sidewalls of the flattened head 110/210 are adjacent and parallel to a respective opposing sidewall of the raised center portion 20. This configuration and arrangement prevents significant rotational movement or pivoting of the bracket 10 around the nail 100/200. In doing so, the mounting device may ensure that the wall-mounted article remains positioned in the desired orientation once hung.

FIG. 15B is a 3D perspective view illustrating a fastener (i.e., a screw) 300 slidably engaged with the bracket 10 shown in the embodiment of FIGS. 1-4, 8 and 18A-B. Screw 300 may have a flattened head 310, which is shaped and dimensioned similar to any of the flattened heads 110/210 of the nails 100/200 shown in the embodiments of FIGS. 5-8, FIGS. 12-14 and FIGS. 18A-18B. Screw 300 may also have a shaft 320 comprising substantially any number and size of threads. Similar to the previously disclosed embodiments, the flattened head 310 of the screw 300 may be slidably engaged with the raised center portion 20 of the bracket 10 by sliding the flattened head underneath the raised center portion, such that the flattened head is sandwiched between the lower surface 25 of the raised center portion and a rear surface of the wall-mounted article. In doing so, the shaft 320 of the screw 300 passes through and extends out of the notched opening 50 in the raised center portion 20 of the bracket 10. When the shaft 320 is fully seated within the notched opening 50, opposing sidewalls of the flattened head 310 are adjacent and parallel to a respective opposing sidewall of the raised center portion 20 of the bracket 10.

When screw 300 is inserted into a wall, the threaded shaft 320 of the screw grips the wall material and prevents the screw from rotating around the insertion point. When the flattened head 310 of the screw 300 is slidably engaged with the bracket 10 shown, e.g., in FIGS. 1-4, the mounting device embodiment comprising screw 300 and bracket 10 ensures that a wall-mounted article does not deviate from a desired orientation once hung, even when only one mounting device is provided on the rear surface of the wall-mounted article.

Figure 15C:
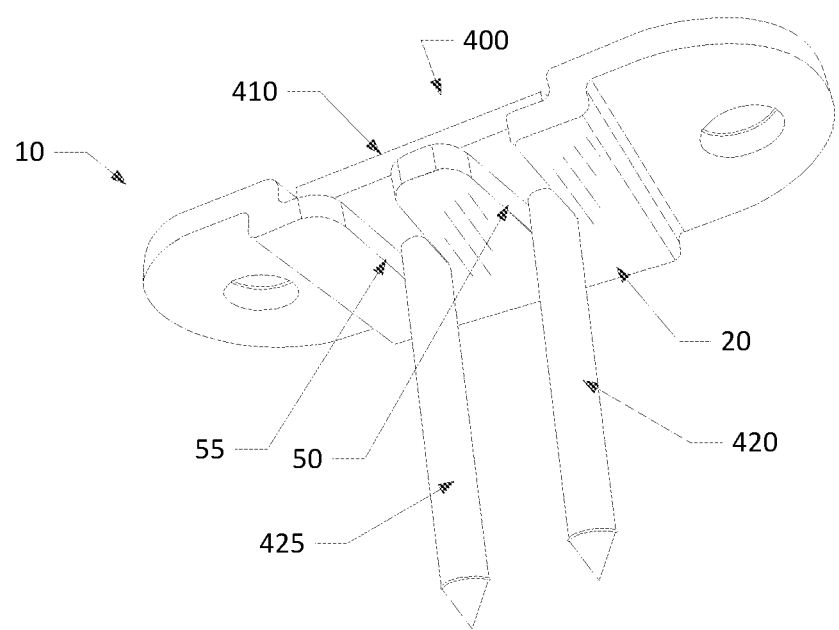
FIG. 15C is a 3D perspective view illustrating a nail with two shafts slidably engaged with a bracket having two notched openings within the raised center portion thereof.

FIG. 15C is a 3D perspective view illustrating yet another embodiment of a mounting device including a specialized bracket 10 and fastener (i.e., a nail) 400. In the embodiment shown in FIG. 15C, bracket 10 includes a pair of notched openings 50, 55 in the raised center portion 20 of the bracket. With the exception of the notched openings 50, 55, bracket 10 may be dimensioned and configured similar to that shown in FIGS. 1-4 and described above. Nail 400 includes two shafts 420, 425, which are dimensioned and configured to slidably engage with the notched openings 50, 55 formed within the raised center portion 20 of the bracket 10 shown in FIG. 15C. Aside from having dual shafts, however, nail 400 may be generally configured as shown in FIGS. 6-7 and 13-14 and described above. Similar to the mounting device embodiment including screw 300 (FIG. 15B), the mounting device embodiment shown in FIG. 15C may ensure that a wall-mounted article does not deviate from a desired orientation once hung, even when only one mounting device is provided on the rear surface of the wall-mounted article.

FIG. 16A is a 3D perspective view illustrating one embodiment of a wall-mounted article 500 having at least one mounting device 520, which is affixed to a rear surface 510 of a wall-mounted article 500 at one example location. Mounting device 520 may include any of the mounting device embodiments shown in FIGS. 1-15, 18 and described herein. In the illustrated embodiment, wall-mounted article 500 is a picture frame, mirror, framed art piece, etc., having a single mounting device 520 affixed to and extending from its rear surface 510. It is noted, however, that the depiction of wall-mounted article 500 in FIG. 16A is merely exemplary, and further noted that any of the embodiments of mounting devices described herein and shown in FIGS. 1-15 and 18 can be used for mounting or hanging substantially any type of decorative or non-decorative article on a wall or other mounting surface. It is additionally noted that, although only one mounting device 520 is shown in FIG. 16A, more than one mounting device 520 can be affixed to a rear surface 510 of a wall-mounted article, in one or more locations on the rear surface 510, in other embodiments. Affixing more than one mounting device 520 to the rear surface 510 guarantees that the wall-mounted article will maintain its desired orientation once hung.

FIGS. 16B and 16C illustrate exemplary embodiments of a wall-mounted article 500 having a plurality of mounting devices (only the mounting bracket 522 portion of the mounting devices is shown) affixed to a rear surface 510 of the wall mounted article at a variety of locations. As in the previous embodiment, the depiction of wall-mounted article 500 in FIGS. 16B and 16C is merely exemplary, and further noted that any of the embodiments of mounting devices described herein and shown in FIGS. 1-15 and 18 can be used for mounting or hanging substantially any type of decorative or non-decorative article on a wall or other mounting surface. It is additionally noted that, although a particular number of mounting brackets 522 are shown as being affixed to the rear surface 510 at particular locations, a fewer or greater number of mounting brackets 522 could be provided on the rear surface 510 at possibly different locations or orientations without departing from the scope of the present disclosure.

Figure 17:
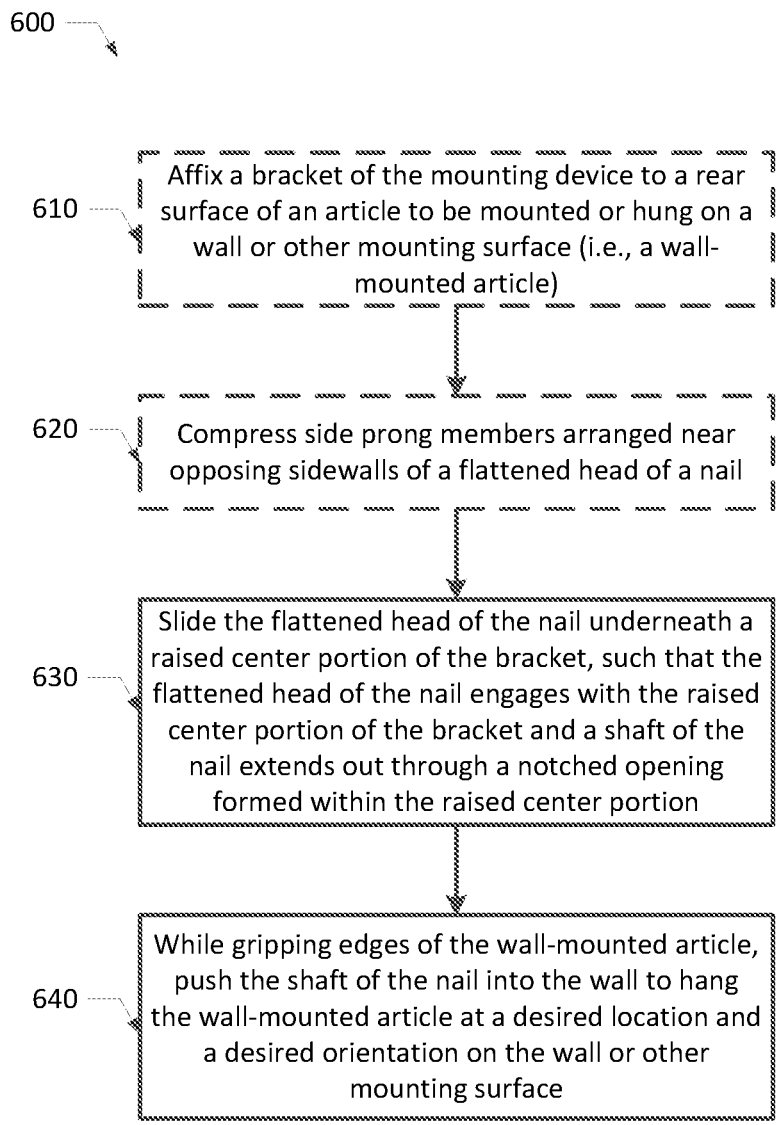
FIG. 17 is a flowchart diagram illustrating one embodiment of a method for hanging a wall-mounted article on a wall using one embodiment of the mounting device described herein.

FIG. 17 is a flowchart diagram illustrating one embodiment of a method 600 that may be used for hanging a wall-mounted article on a wall or other vertical surface using a mounting device including a bracket and a nail, as described herein. In some embodiments, method 600 may begin in step 630 by sliding the nail into a notched opening of the bracket, such that a flattened head of the nail engages with a raised center portion of the bracket and the shaft of the nail extends out through the notched opening. While gripping opposing edges of the wall-mounted article, the shaft of the nail may be pushed into the wall (in step 640) to hang the wall-mounted article at a desired location and a desired orientation on the wall. Because opposing sidewalls of the flattened head are positioned adjacent and parallel to opposing sidewalls of the raised center portion of the bracket when the flattened head of the nail is engaged with the raised center portion, the mounting device and method provided herein prevents the bracket from pivoting around the nail. As discussed above, this may substantially prevent the wall-mounted article from deviating from the desired orientation once the wall-mounted article is hung.

In some embodiments, one or more steps may be performed prior to sliding the nail into the notched opening of the bracket in step 630. For example, method 600 may include affixing the bracket to a rear surface of the wall-mounted article in optional step 610 prior to sliding the nail into the notched opening of the bracket, if the bracket was not pre-installed on the rear surface of the article.

In some cases, the flattened head of the nail may include a pair of side prong members, as described above and shown in FIGS. 12-14 and FIGS. 18A-18B. In such cases, method 600 may further include compressing the side prong members in optional step 620 prior to sliding the nail into the notched opening of the bracket in step 630. Once compressed and engaged with opposing sidewalls of the raised center portion, the side prong members apply an outward force against the opposing sidewalls of the raised center portion to secure the flattened head of the nail within the raised center portion of the bracket.

In some embodiments, the shaft of the nail may simply be pushed into the wall (or other mounting surface) in step 640 to hang the wall-mounted article at a desired location and a desired orientation, as shown in FIG. 17 and described above. Such embodiments are suitable when the wall or other mounting surface comprises a relatively soft material, such as drywall (or gypsum board), cork board, and some soft woods.

In other embodiments, it may be necessary to first attach the nail to the wall (or other mounting surface) before guiding the bracket onto the wall-mounted nail. This alternative installation method may be used when mounting a wall-mounted article onto substantially harder surfaces, when the shaft of the nail hits a stud behind a softer wall material, etc. In one example, a hammer or other blunt object may be used to forcibly insert the shaft of the nail into the wall. Once the nail is attached to the wall at the desired location and the desired orientation, a user gripping edges of the wall-mounted article may simply guide the bracket onto the wall-mounted nail.

In other embodiments, the nail may, instead, be implemented as a screw having a flattened head and a threaded shaft, which may be screwed into the wall. In one example embodiment, the screw may be similar to screw 300 shown in FIG. 15B and discussed above. If a screw is used, the screw may be inserted into the wall before or after the flattened head of the screw is engaged with the raised center portion of the bracket. In one exemplary embodiment, the flattened head of the screw may be slidably engaged with the raised center portion of the bracket prior to positioning the wall-mounted article at a desired location on the wall. While gripping edges of the article, the article may be rotated a number of times, while applying a force normal to the wall, to insert the screw into the wall. Alternatively, a screw driver or other torque tool may be used to insert the screw into the wall at the desired location and orientation, and while gripping edges of the article, a user may simply guide the bracket onto the wall-mounted screw.

Regardless of the particular installation method used, the unique configuration of the various mounting device embodiments described herein enables an article to be mounted or hung on a wall at a desired location and orientation, and by the specific configuration of the mounting device, prevents the wall-mounted article from deviating from the desired orientation once it is hung. Even in embodiments in which a single mounting device is used to provide a single point of attachment to the wall, the mounting device described herein prevents the wall-mounted article from rotating around the single point of attachment (i.e., prevents the article from becoming "crooked") when the article or the wall upon which the article is mounted is disturbed (e.g., due to dusting, people or animals bumping into the wall, doors being slammed, etc.).

It will be appreciated to those skilled in the art having the benefit of this disclosure that this disclosure is believed to provide various embodiments of mounting devices, wall-mounted articles comprising such mounting devices and methods for mounting or hanging wall-mounted articles using such mounting devices. Further modifications and alternative embodiments of various aspects of the disclosure will be apparent to those skilled in the art in view of this description. It is to be understood that the various embodiments of the disclosed mounting devices shown and described herein are to be taken as the presently preferred embodiments. Elements and materials may be substituted for those illustrated and described herein, parts and processes may be reversed, and certain features of the disclosed embodiments may be utilized independently, all as would be apparent to one skilled in the art after having the benefit of this disclosure. It is intended, therefore, that the following claims be interpreted to embrace all such modifications and changes and, accordingly, the specification and drawings are to be regarded in an illustrative rather than a restrictive sense.

What is claimed is:

1. A mounting device for hanging an article on a mounting surface, the mounting device comprising:
    a bracket having a raised center portion arranged between two side portions formed integral and contiguous with the raised center portion, wherein a lower surface of the raised center portion is elevated above a lower surface of the two side portions, and wherein the raised center portion comprises opposing sidewalls connecting the lower surface of the raised center portion to the lower surface of the two side portions; and
    a fastener having a flattened head comprising opposing sidewalls and a shaft extending from the flattened head, wherein the flattened head of the fastener is shaped and dimensioned, such that when the flattened head of the fastener is slidably engaged with the raised center portion of the bracket:
        each one of the opposing sidewalls of the flattened head is arranged adjacent and parallel to a respective one of the opposing sidewalls of the raised center portion of the bracket; and
        the flattened head of the fastener is sandwiched between a lower surface of the raised center portion of the bracket and a rear surface of the article; and
    wherein the bracket comprises a notched opening extending from a bottom edge of the raised center portion toward a mid-point of the raised center portion, and wherein the notched opening is configured for receiving and guiding the shaft of the fastener when the flattened head of the fastener is slidably engaged with the raised center portion of the bracket.

2. The mounting device as recited in claim 1, wherein a diameter of the notched opening is substantially consistent along a majority of a length of the notched opening, and wherein the diameter of the notched opening is slightly larger than a diameter of the shaft of the fastener.

3. The mounting device as recited in claim 1, wherein the fastener comprises a nail having two shafts extending from the flattened head, and wherein the bracket comprises a pair of notched openings configured for receiving and guiding the two shafts of the nail when the flattened head of the nail is slidably engaged with the raised center portion of the bracket.

4. The mounting device as recited in claim 1, wherein an upper surface of the flattened head of the fastener and the lower surface of the raised center portion of the bracket comprise substantially identical quadrilateral shapes.

5. The mounting device as recited in claim 1, wherein the opposing sidewalls of the raised center portion are parallel to each other, and wherein the opposing sidewalls of the flattened head are parallel to each other.

6. The mounting device as recited in claim 1, wherein the opposing sidewalls of the raised center portion are not parallel to each other, and wherein the opposing sidewalls of the flattened head are not parallel to each other.

7. The mounting device as recited in claim 1, wherein the flattened head of the fastener comprises a pair of notched openings, wherein each of the notched openings is arranged proximate to a respective one of the opposing sidewalls of the flattened head to form a pair of side prong members.

8. The mounting device as recited in claim 7, wherein each side prong member comprises a projection arranged proximate to a distal end of the side prong member.

9. The mounting device as recited in claim 7, wherein each side prong member comprises one or more teeth, which are configured to engage with one or more teeth included on the opposing side walls of the raised center portion of the bracket.

10. The mounting device as recited in claim 1, wherein the fastener is a nail having a substantially smooth, straight shaft without any threads.

11. The mounting device as recited in claim 1, wherein the fastener is a nail having two substantially smooth, straight shafts without any threads.

12. The mounting device as recited in claim 1, wherein the fastener is a screw having a threaded shaft.

13. An article comprising at least one mounting device affixed to a rear surface of the article for hanging the article on a mounting surface, wherein the at least one mounting device comprises:
- a bracket having a raised center portion arranged between two side portions formed integral and contiguous with the raised center portion, wherein a lower surface of the raised center portion is elevated above a lower surface of the two side portions, and wherein the raised center portion comprises opposing sidewalls connecting the lower surface of the raised center portion to the lower surface of the two side portions; and
- a fastener having a flattened head comprising opposing sidewalls and a shaft extending from the flattened head, wherein the flattened head of the fastener is shaped and dimensioned, such that when the flattened head of the fastener is slidably engaged with the raised center portion of the bracket:
  - each one of the opposing sidewalls of the flattened head is arranged adjacent and parallel to a respective one of the opposing sidewalls of the raised center portion of the bracket; and
  - the flattened head of the fastener is sandwiched between a lower surface of the raised center portion of the bracket and a rear surface of the article; and
- wherein the bracket comprised a notched opening extending from a bottom edge of the raised center portion toward a mid-point of the raised center portion, and wherein the notched opening is configured for receiving and guiding the shaft of the fastener when the flattened head of the fastener is slidably engaged with the raised center portion of the bracket.

14. The article as recited in claim 13, wherein the fastener comprises a nail having two shafts extending from the flattened head, and wherein the bracket comprises a pair of notched openings configured for receiving and guiding the two shafts of the nail when the flattened head of the nail is slidably engaged with the raised center portion of the bracket.

15. The article as recited in claim 13, wherein the opposing sidewalls of the raised center portion are parallel to each other, and wherein the opposing sidewalls of the flattened head are parallel to each other.

16. The article as recited in claim 13, wherein the opposing sidewalls of the raised center portion are not parallel to each other, and wherein the opposing sidewalls of the flattened head are not parallel to each other.

17. The article as recited in claim 13, wherein the flattened head of the fastener comprises a pair of notched openings, wherein each of the notched openings is arranged proximate to a respective one of the opposing sidewalls of the flattened head to form a pair of side prong members.

18. The article as recited in claim 17, wherein each side prong member comprises a projection arranged proximate to a distal end of the side prong member.

19. The article as recited in claim 17, wherein each side prong member comprises one or more teeth, which are configured to engage with one or more teeth included on the opposing side walls of the raised center portion of the bracket.

20. The article as recited in claim 13, wherein the fastener is a nail having a substantially smooth, straight shaft without any threads.

21. The article as recited in claim 13, wherein the fastener is a nail having two substantially smooth, straight shafts without any threads.

22. The article as recited in claim 13, wherein the fastener is a screw having a number of threads.

* * * * *